US008296805B2

(12) United States Patent
Tabatabai et al.

(10) Patent No.: US 8,296,805 B2
(45) Date of Patent: Oct. 23, 2012

(54) COMMAND DESCRIPTION SCHEME PROVIDING FOR DYNAMIC UPDATE OF INSTANCE DOCUMENTS AND THEIR ASSOCIATED SCHEMA

(75) Inventors: Ali Tabatabai, Beaverton, OR (US); Hawley K. Rising, San Jose, CA (US)

(73) Assignees: Sony Corporation, Tokyo (JP); Sony Electronics Inc., ParkRidge, NJ (US)

( * ) Notice: Subject to any disclaimer, the term of this patent is extended or adjusted under 35 U.S.C. 154(b) by 2736 days.

(21) Appl. No.: 09/865,030

(22) Filed: May 24, 2001

(65) Prior Publication Data

US 2002/0085028 A1   Jul. 4, 2002

Related U.S. Application Data

(60) Provisional application No. 60/208,121, filed on May 30, 2000.

(51) Int. Cl.
*H04N 5/445* (2006.01)
(52) U.S. Cl. .......................................... 725/50; 709/219
(58) Field of Classification Search .............. 725/50–61, 725/93, 116, 131–134, 139–142; 707/100–104.1; 709/217–232
See application file for complete search history.

(56) References Cited

U.S. PATENT DOCUMENTS

| | | | | |
|---|---|---|---|---|
| 6,070,167 | A * | 5/2000 | Qian et al. ........................... 1/1 |
| 6,195,088 | B1 * | 2/2001 | Signes .......................... 715/201 |
| 6,551,623 | B1 * | 4/2003 | Rang .............................. 424/528 |
| 6,593,936 | B1 * | 7/2003 | Huang et al. ................... 345/619 |
| 6,697,869 | B1 * | 2/2004 | Mallart et al. ................ 709/231 |
| 6,751,623 | B1 * | 6/2004 | Basso et al. .................... 707/101 |
| 7,124,365 | B2 * | 10/2006 | Cavallerano et al. ......... 715/716 |
| 7,149,770 | B1 * | 12/2006 | Kalva et al. ................... 709/203 |

OTHER PUBLICATIONS

Wan, Ernest et al, DDL Working Draft 4.0, May 25, 2000, ISO/IEC MPEG 00/N3575.*
Hunter, Jane, MPEG-7 XML Schema Problem Issues, May 11, 2000, http://archive.dstc.edu.au/mpeg7-ddl/issues.html.*
Nack, Frank and Lindsay, Adam; Everything You Wanted to Know About MPEG-7: Part 1; IEEE Multimedia; Jul.-Sep. 1999; pp. 65-77.*
Nack, Frank and Lindsay, Adam; Everything You Wanted to Know About MPEG-7: Part 2; IEEE Multimedia; Oct.-Dec. 1999; pp. 64-73.*
XML Schema: Primer, David C. Fallside, ed. See http://www.w3.org/TR/2000/WD-xmlschema-0-20000407/primer.html, Oct. 24, 2000.
XML Path Lanaguage (XPath) World Wide Web Consortium. XML Path Language (XPath). W3C Proposed Recommendation. See http://www.w3.org/TR/REC-XPath, Nov. 16, 1999.
World Wide Web Consotrium. XML Pointer Language (XPointer). W3C Working Draft. See http://www.w3.org/TR/WD-xptr, Jun. 7, 2000.

* cited by examiner

*Primary Examiner* — Annan Shang (57) ABSTRACT

The present invention provides a method and system for dynamically updating descriptions of AV content, such as MPEG-7 content descriptions. One embodiment provides for a method in which first a server issues a command indicating the type of update to make to the description on a client computer. Specifically, the update may be to add, delete, or change a node in a tree or graph structure describing the AV content. For example, the command may specify an update to an instance document or its associated schema. The server also specifies the location in the description to perform the update, which may be at an absolute or relative address. Next, the server sends the data, if any, to be added or used for the change. Embodiments also provide for steps to check that the update is authorized.

26 Claims, 5 Drawing Sheets

COMMAND DESCRIPTION SCHEME PROVIDING FOR DYNAMIC UPDATE OF INSTANCE DOCUMENTS AND THEIR ASSOCIATED SCHEMA

RELATED U.S. APPLICATION

This Application claims priority to U.S. Provisional Application entitled, "Proposed Schema for CommandDS," Application No. 60/208,121, filed on May 30, 2000, which application is hereby incorporated by reference.

FIELD OF THE INVENTION

The present invention relates to the field of coding of moving pictures and associated audio. Specifically, the present invention relates to a method for dynamically updating descriptions of audio-visual content by providing for a command schema which allows for additions, deletions, and changes to the nodes in instance documents and their associated schema.

BACKGROUND ART

In recent years applications such as the Internet have allowed for dramatic changes in the way information, such as audio visual (AV) multimedia content, may be accessed and worked with. Examples which are suggested are allowing user interaction with audio visual (AV) multimedia content, as well as searches and queries based on the AV content. Further examples include allowing a user to request information (such as restaurants in the user's location) or to change the viewpoint from which a video scene is viewed.

To facilitate such processing, the AV content may have an associated description of the content. One technique to describe such AV content is presented in the MPEG-7 standard otherwise known as "Multimedia Content Description Interface", an ISO/IEC standard developed by the Moving Picture Experts Group (MPEG). At the lowest level of description, the MPEG-7 standard may use 'Descriptors' which represent low-level AV features, such as signal amplitude, frequency, and spectral tilt. A schema language, such as the Data Description Language (DDL) may be used to represent the results of modeling audiovisual data. The DDL specifies the syntax for creating Description Schemes from the Descriptors. The description of the AV information may be accomplished with a hierarchical tree structure or a graph structure, depending on the nature of the information.

Another conventional technique of describing audiovisual multimedia content are key frames. Key frames are useful for creating summaries of video, for allowing near random access to video, for comparing video, and for referring to video in print. However, most implementations of key frames are static, consisting of a single list of the key frames related to some quantization of the video sequence, such as a sequential segmentation into shots or scenes.

Unfortunately, for a very large piece of audiovisual content, re-sending descriptions of the content (or key frames) for a fine grained quantization, such as individual shots may be unfeasible due to bandwidth limitations. For example, if the average shot length in a two hour feature film length movie is ten seconds, the required set of shots would be 6000 key frames. Assuming a transmission rate of 30 frames per second, it would take 3.3 minutes to re-send the key frames. Unfortunately, this is not within an interactive response range.

SUMMARY OF THE INVENTION

Therefore, it would be advantageous to provide a method for dynamically updating audio-visual content descriptions. A still further need exists for a technique which allows AV content descriptions which are compliant with an industry standard, such as MPEG-7, to be dynamically updated. A further need exists for a technique which allows such updates to be performed in real time for a user connected to a server at conventional speeds, thus allowing for interactive processing. An even further need exists for such a technique which allows updates to be performed either 'on-the-fly' based on user requests or using pre-processed information to provide the information for the update.

The present invention provides a method and system for dynamically updating descriptions of AV content. The descriptions may be, for example, compliant with the MPEG-7 standard. One embodiment provides for a method in which first a server issues a command indicating the type of update to make to the description on a client computer. Specifically, the update may be to add, delete, or change a node in a tree or graph structure describing the AV content. For example, the command may specify an update to an instance document or its associated schema. The server also specifies the location in the description to perform the update, which may be at an absolute or relative address. Next, the server sends the data, if any, to be added or used for the change. Embodiments also provide for steps to check that the update is authorized. The client may need to have authorization for the requested update and the server may need to have authorization to perform the update.

The update may be made to the structure of the description, for example, the schema. Alternatively, the update may be made to a parameter at a node in the structure, for example, instance information is updated. The step of specifying the location of the update may specify an absolute or local address in the description.

In one embodiment, adding to the description is accomplished by deriving by extension, deleting is accomplished by a deriving by restriction, and changing the description is accomplished by a combination of the two.

The update to the description may be made from information which is stored on the server. Alternatively, the update may be made 'on-the-fly' by altering the description, for example, altering the shot identification or scene identification.

Yet another embodiment provides for a computer readable medium which has instructions stored thereon for updating MPEG-7 audio-visual content descriptions. The instructions may be referred to as a Command Description Scheme (CommandDS). The instructions comprise a command structure for specifying the type of update, for example, add, delete, or change. The instructions also specify the location of the update, and whether the update is authorized.

The present invention provides these advantages and others not specifically mentioned above but described in the sections to follow.

DETAILED DESCRIPTION OF THE INVENTION

In the following detailed description of the present invention, a method and system for dynamically updating instance documents, as well as their associated schema, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Command Description Scheme Providing for Dynamic Update of Instance Documents and Their Associated Schema The present invention provides for a method and system for dynamically updating instance documents, as well as their associated schemas. The present invention is suitable for updating documents which describe AV content and are compliant with the MPEG-7 standard.

Figure 1:
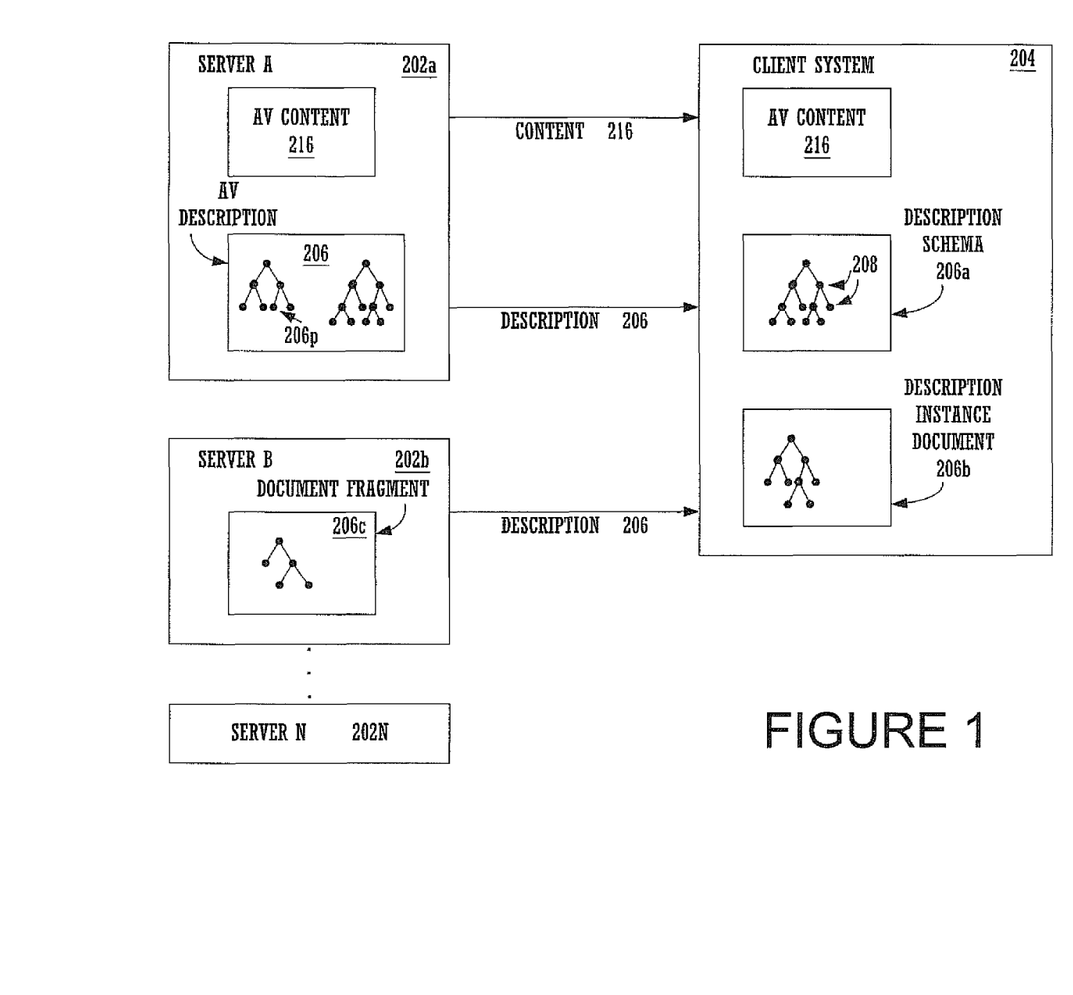
FIG. 1 is a diagram of an exemplary system for updating MPEG-7 audio-visual content descriptions, according to an embodiment of the present invention.

Embodiments of the present invention are operational in a server/client environment. Referring now to FIG. 1, a server 202a is shown transferring audio-visual content 216 and an associated description 206 of that content 216 to a client 204. Embodiments of the present invention provide a technique for updating the description 206, which may occur in response to, for example, client 204 interaction with the content 216, client 204 searches or queries based on the content 216, or client 204 preferences. For example, the client 204 may wish to view a video scene from a different angle.

The audio-visual descriptions 206, which embodiments of the present invention dynamically update, are constructed by using the Data Description Language (DDL), in the preferred embodiment. When using DDL to describe AV content 216, the audio-visual descriptions 206 may form a tree-structure, such as the ones on the client 204 and servers 202 in FIG. 1. The description 206 may be formed by a DDL parser. The various nodes 208 of the tree contain information describing a portion of the AV content 216, such as its color, motion, shape, texture, etc. For example, if the AV content 216 is of a soccer match, the description 206 may describe the color of the players' uniforms, personal information about the players, and the rules of soccer. As a further example, one node 208 may describe the entire soccer ball, another node 208 a player's head, etc. In this fashion, a single motion vector may be associated with a given node 208, although this is not required. It will be understood by those of ordinary skill in the art that the description 206 may have any number of nodes 208. Furthermore, the description 206 need not be hierarchical. For example, the description 206 may be in the form of a graph rather than a hierarchical tree structure. For example, the graph may be organized as a group of nodes 208 and a group of edges relating the nodes 208. Finally, while the trees are illustrated as binary trees, the present invention is well suited to updating non-binary trees.

The description 206 in FIG. 1 may represent a particular instantiation 206b (e.g., instance document) corresponding to a particular schema 206a. The schema 206a may be written in DDL and may be a tree structure (or alternatively a graph structure). Importantly, the updates may take place to either the schema 206a or the instance document 206b. An update to the schema 206a may correspond to a structural change from, for example, a ball to a person. An update to the instance document 206b may correspond to an informational change, for example, a change of the ball's color. It will be understood that an update to an AV content description 206 may be accomplished by updating an instance document 206b or its associated schema 206a or the like.

The MPEG-7 standard may use the DDL programming language to describe audio-visual content 216. An Extensible Markup Language (XML) based schema language, such as the Data Description Language may be used to represent the results of modeling audiovisual data. The DDL specifies the syntax for creating Description Schemes (DS) from the Descriptors. Embodiments of the present invention provide for a Command Description Scheme (CommandDS), which may be used to make updates to the audio-visual descriptions 206. While the preferred embodiment updates MPEG-7 content descriptions 206, the present invention is not limited to updating MPEG-7 descriptions 206. Furthermore, while the preferred embodiment updates documents described in DDL, the present invention is not limited to updating documents written in DDL.

In order to efficiently make such updates, the server 202 does not need to transfer an entire new description 206 of the content 216. Instead the server 202a transfers a series of commands and data, such that the client 204 may update the description 206. For example, if the description 206 is constructed as a tree structure, nodes 208 may be deleted, added, or changed. Furthermore, information at a node 208 may be changed.

The updates may be generated in two ways. First, the server 202 has stored on it pre-processed descriptions 206p that may be used for updates such as a user request for information about local restaurants. Second, the update may be performed 'on-the-fly'. For example, the client 204 or another process on the server 202 may send a request to change a scene. The server 202 will send commands and data to the client 204 so that the description 206 may be updated. The client 204 may receive updates from multiple servers, such as server 202b through server 202n. The present invention is also well suited to a peer-to-peer system or a broadcast system. Furthermore, embodiments allow for both push and pull operations.

Furthermore, dynamically updating the audio-visual descriptions 206 may be performed in at least three ways, adding deleting, or changing. For example, server 202b may send a document fragment 206c to be added to the tree structure before or after a target node 208. Nodes may be deleted from the tree structure, or the nodes 208 of the tree structure may be changed. Furthermore, the information (e.g., a color descriptor) at a node 208 may be changed.

In the preferred embodiment, the parser that creates the description trees is an XML Path Language/XML Pointer Language (XPath/XPointer) aware parser. Thus, the absolute and relative location of the nodes 208 in the tree are identified by the triple (e.g., axis, nodetest, and predicate) constructs. These are attached as fragment modifiers to a Uniform Resource Locator (URI) address. For example, "po.xml#items/child::item[positions( )=1]/attribute::partNum" is a valid XPath expression that selects the PartNum attribute of the first child <item> of <items>. The XPointer extends to XPath by introducing point and range concepts as positional declarations within a document. A suitable parser is described in "XML Path Language (XPath), World Wide Web Consortium, W3C Proposed Recommendation," and "XML Pointer Language (XPointer), World Wide Web Consortium, W3C Working Draft."

An embodiment of the present invention takes the following approach to accomplish the dynamic update to the tree or graph. A delete operation corresponds to deriving a new type by restriction and an add operation corresponds to deriving by extension. A parent schema 206a is derived from a source schema 206a by using 'constraint' value for 'derivedBy' attribute with the base as the source schema 206a. The list of constraints has a one-to-one mapping with the list of delete operations. Similarly, the parent node 208 is extended to a new schema 206a by assigning 'extension' value to 'derivedBy' attribute with the base as the parent schema 206a. In this case, the list of extensions has a one-to one mapping with the list of add operations.

Furthermore, a change operation may be accomplished by a combination of derive by extension and derive by restriction. For example, if a node 208 which is internal to the tree is to be changed, first a delete operation is done, followed by an add operation. In one embodiment, document fragments are created on the receiving (e.g., client 204) side, then a node 208 is deleted. Finally, document fragments are added back to the tree. However, the change operation may be performed by other combinations of add and delete commands. For example, the tree below the deleted node 208 may be re-created.

After the update has been accomplished, the XML parser may check the validity and well formedness against the source schema 206a and throw an exception if an invalid operation is detected. Throwing an exception may be used as a signal to generate a new schema 206a.

An embodiment provides for flags to indicate whether the changes made to the source document and accordingly to the schema 206a should be reflected in separate ".xml" and "xsd" files.

Figure 2:
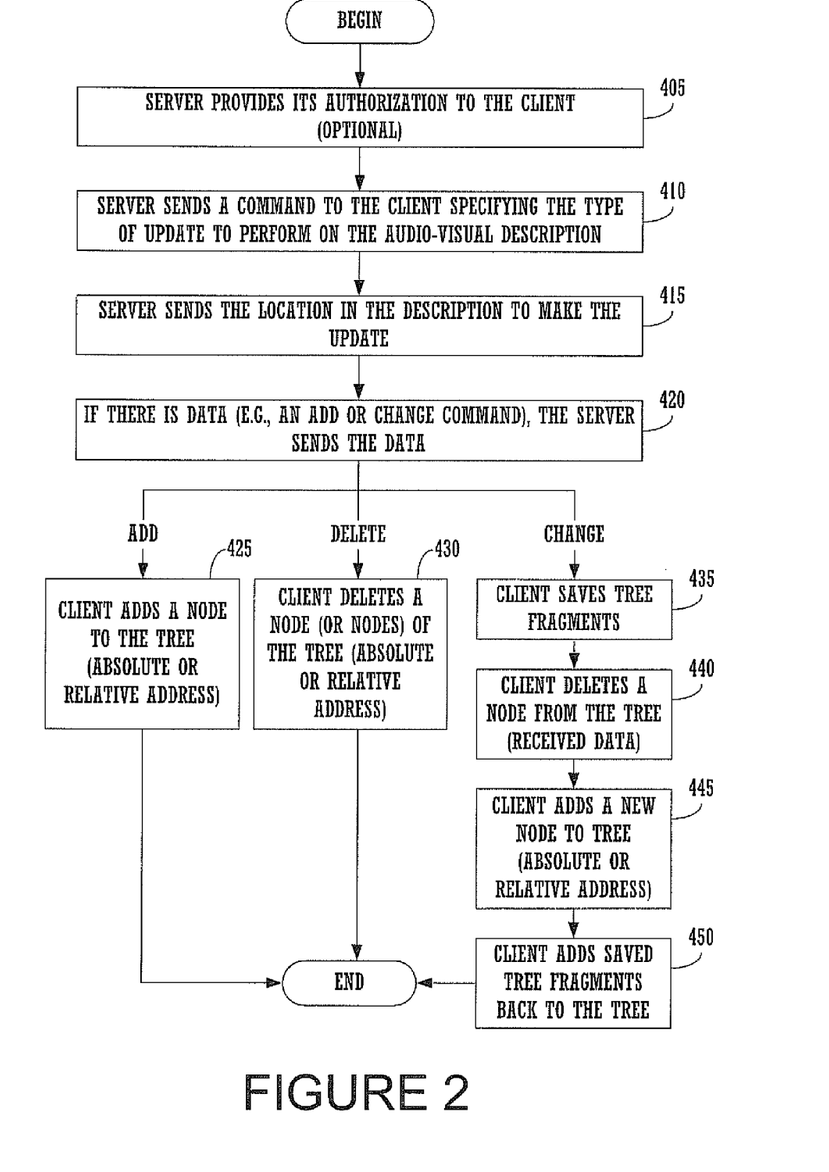
FIG. 2 is a flowchart illustrating the steps of a process of dynamically updating descriptions of MPEG-7 content, according to an embodiment of the present invention.

The steps of a process of dynamically updating audio-visual descriptions 206 are described in FIG. 2. The steps of the process may be executed on a general purpose computer such as the one illustrated in FIG. 4. When an update is required the server 202 determines how the description 206 needs to be re-configured and where the data, if any, to be sent to the client 204 is stored. The process may be repeated as many times as necessary to update the entire description 206. In step 405, the server 202 provides its authorization to make the updates to the client 204. This step need not be repeated if multiple update commands are sent.

In step 410, the server 202 sends a command which indicates the type of update which is to be made to the AV description 206 (e.g., description schema 206a or description instance document 206b). For example, this command specifies whether to add, delete, or change a node 208. The command may take various forms including, but not limited to the XML implementation or DTD implementation defined herein.

In step 415, the server 202 sends the location within the description 206 for the update to the client 204. This may be specified as either an absolute or as a relative address. A relative address may be useful for allowing a server 202 which has knowledge of only a portion of the description 206 to direct an update. Furthermore, the update may be before or after a target node 208.

In step 420, the server 202 sends the data to be added or to be used in the change. A part of the data may be a URI reference, for example, a reference to a schema 206a. The data may be stored on the server 202 or generated on-the-fly. It is not required that data be sent, for example, if the update is a delete.

As step 425 describes, if the command is to add to the description 206, the client 204 will add a node 208 to the tree or graph using the data, along with the absolute or relative address provided by the server 202. In an embodiment using XML, the add is accomplish via an derive by extension.

If instead, the command is a delete, then the client 204 need only delete the node 208, in step 430. In an embodiment using XML, the delete is accomplish via an derive by restriction.

If a change command is specified, the process is slightly more complex. Starting in step 435, the client 204 saves tree fragments below the location of the node 208 to be changed. Then, in step 440, the client 204 deletes the node 208 at the change location.

Next, in step 445, the client 204 adds a new node 208 at the change location. The client 204 uses the data sent from the server 202 to fill in the various elements, and parameters at this node 208.

Finally, in step 450, the client 204 adds the saved tree fragments back to the tree below the added node 208. Thus, a change to the specified node 208 is accomplished. The change may be accomplished by other combinations of add and delete commands.

While process describes the process as between a server 202 and a client 204, it will be understood that the process may take place in the upstream direction, as well. Furthermore, the present invention is well suited to both broadcast and peer-to-peer contexts.

Exemplary XML CommandDS Schema

In one embodiment, a command DS schema is providing for and is constructed in the XML programming language.

The CommandDS schema may be used to update AV content descriptions 206. It will be understood that the CommandDS schema is not the same schema 206 as shown in FIG. 1 to describe the AV content 216. The CommandDS schema is comprised of several Complex Types and Simple Types. After an initial simple type "listOfByte", the CommandDS schema has a simple type for "commandType" providing for add, delete, and change commands.

```
<simpleType name="listOfByte" base="unsignedByte" derivedBy="list"/>
<simpleType name="commandType" base="string">
    <enumeration value="add"/>
    <enumeration value="delete"/>
    <enumeration value="change"/>
</simpleType>
```

The update to the AV description 206 may be executed before or after a specified node 208. The following simple type of the CommandDS allows for this.

```
<simpleType name="insertPosition" base="string">
    <enumeration value="before"/>
    <enumeration value="after"/>
</simpleType>
```

The command DS also allows for selecting non-MPEG-7 data as the following simple and complex types describe.

```
<simpleType name="binaryContentType" base="NOTATION">
    <enumeration value="xmlbin"/>
    <enumeration value="bifs"/>
    <enumeration value="mp4"/>
</simpleType>
<complexType name= "VeotorB" base= "listOfByte" derivedBy= "extension">
    <attribute name= "size" type= "nonNegativeInteger"/>
</complexType>
```

In order to prevent an un-authorized updates to the AV content description 206, the CommandDS schema provides for a complex type that allows authorization to be checked, as follows:

```
<complexType name= "authorityLevel">
    <attribute name= "primaryKey" type= "integer"/>
    <attribute name= "secondaryKey" type= "integer"/>
    <attribute name= "level" type= "integer"/>
</complexType>
```

The CommandDS Schema also has a complex type for the data to be added or changed in the AV content description 206, as follows:

```
<complexType name= "nodeValue">
    <choice>
        <element name= "binaryValue">
        </complexType>
            <element name= "nodeName" type= "string" minOccurs= "0"
                    maxOccurs="1"/>
            <element name= "schemaLocation" type= "uriReference"/>
            <element name= "value" type= "VectorB" />
            <attribute name= "binaryType" type= "binaryContentType" use=
                    "optional"/>
        </complexType>
    </element>
    <element name= "ascii Value">
        </complexType>
        <choice>
            <any namespace=##any minOccurs= "1" maxOccurs=
                    "unbounded" processContent= "skip"/>
            <anyAttribute namespace= ##any minOccurs= "1" maxOccurs=
                    "unbounded"/>
        <choice>
        </complexType>
    </element>
    <element name= "referenceValue" type= "uriReference"/>
    <choice>
</complexType>
```

The CommandDS provides a Command Script as follows:

```
<complexType name= "commandScript">
    <element name= "command" type= "commandDS" minOccurs= "1"
            maxOccurs= "unbounded"/>
    <attribute name= "authority" type= "authorityLevel" use= "required"/>
    <attribute name= "writeXML" type= "boolean" use= "default" value=
            "false"/>
    <attribute name= "resultXML" type= "uriReference" use= "optional"/>
    <attribute name= "writeXSD" type= "boolean" use= "default" value=
            "false"/>
    <attribute name= "resultXSD" type= "uriReference" use= "optional"/>
</complexType>
```

Finally, a complex type of Command DS is presented:

```
<complexType name= "commandDS">
    <element name= "value" type= "nodeValue" minOccurs= "0"
        maxOccurs= "1"/>
    <element name= "nextCommand" type= "commandDS" minOccurs= "0"
        maxOccurs= "unbounded"/>
    <attribute name= "sourceXML" type= "uriReference" use= "optional"/>
    <attribute name= "sourceXSD" type= "uriReference" use= "optional"/>
    <attribute name= "select" type= "uriReference" use="required"/>
    <attribute name= "type" type= "commandType" use="required"/>
    <attribute name= "position" type= "insertPosition" use="default" value=
        "after"/>
</complexType>
```

This completes the description of the CommandDS schema.

For binary values the attribute is called 'binaryContentType', which is of the type 'NOTATION'. The parser will send the binary data associated with the notation to an appropriate decoder. The decoder may be identified by the following declaration, for example:

<binaryContentType name='xmlbin' system='XMLBinaryDecoder.exe'/>

The notation name used is 'xmibin'. Whenever the parser encounters such a notation name it sends its associated binary data to be decoded by 'XML BinaryDecoder'. The parser may also be instructed to deal with Non-XML data, such as MPEG-4 BIFS or MP4 based file formats. For example, whenever a bifs notation is used a BIFS decoder is used. In this case, the following declaration is used:

<binaryContentType name='bifs' system='bifsDecoder.exe'/>

Exemplary CommandDS DTD Schema Implementation

The present invention is not limited to an XML CommandDS schema. A DTD based implementation of the CommandDS schema for dynamically updating AV content descriptions 206 follows:

```
<!ELEMENT commandScript (commandDS+)>
<!ELEMENT commandDS (childRef, (asciiValue | binaryValue |
    referenceValue) )>
<!ELEMENT childRef (reference | number)>
<!ELEMENT reference EMPTY>
<!ATTLIST childReference IDREF #REQUIRED>
<!ELEMENT number EMPTY>
<! This tells us which child number of the parent>
<!ATTLIST childNumber NMTOKEN #REQUIRED>
<!ELEMENT asciiValue ANY>
<!ELEMENT referenceValue EMPTY>
<!ATTLIST referenceValue ref IDREF #REQUIRED>
<!ELEMENT binaryValue EMPTY>
<!ATTLIST binaryValue value NOTATION (xmlbin, bifs, mp4, mpeg)
    "xmlbin">
<!NOTATION xmlbin SYSTEM "xmlBinaryDecoder.exe">
<!NOTATION bifs SYSTEM "bifsDecoder.exe">
<!ATTLIST commandDS commandType (add | delete | change)>
<!ATTLIST commandDS parentRef IDREF #REQUIRED>
<!ATTLIST commandDS position (before | after) #DEFAULT "after">
```

Although a way to check authorization is not shown in the DTD exemplary implementation, the exemplary DTD implementation may be modified to provide for all of the functionality that the XML based implementation has.

While the present invention has been described in the context of updated MPEG-7 descriptions 206, the present invention may be used as the foundation for creating an XSL-like language for editing and authoring XML documents.

Figure 3A:
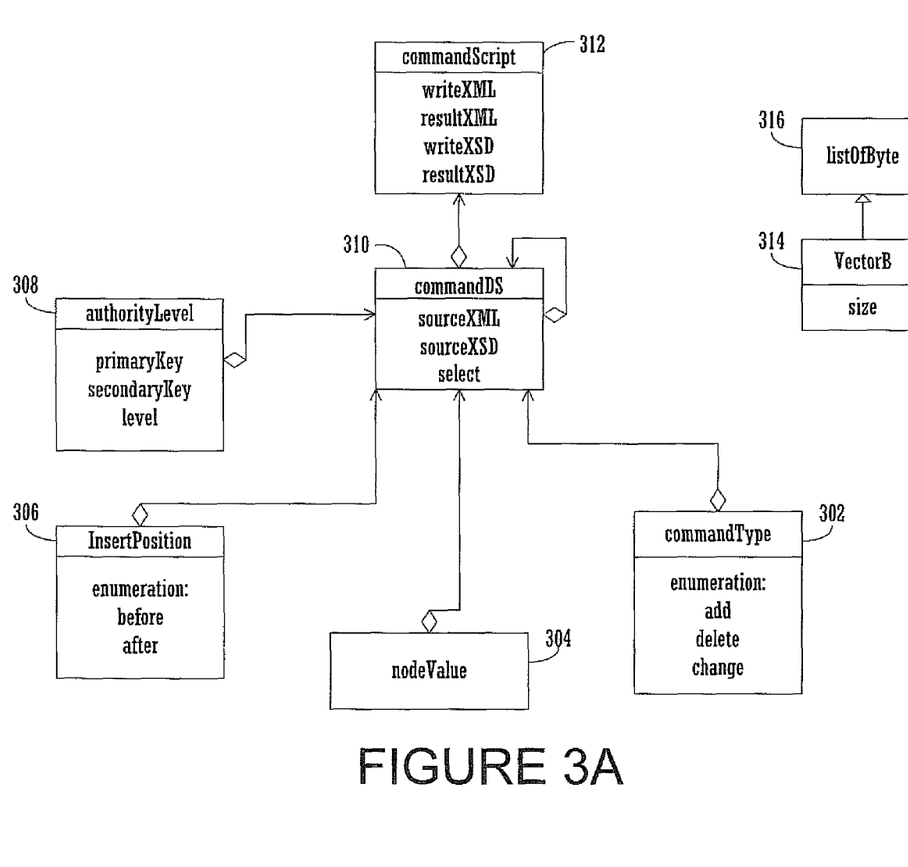
FIG. 3A and FIG. 3B are diagrams illustrating a UML representation of a Command Description Scheme, according to an embodiment of the present invention.
Figure 3B:
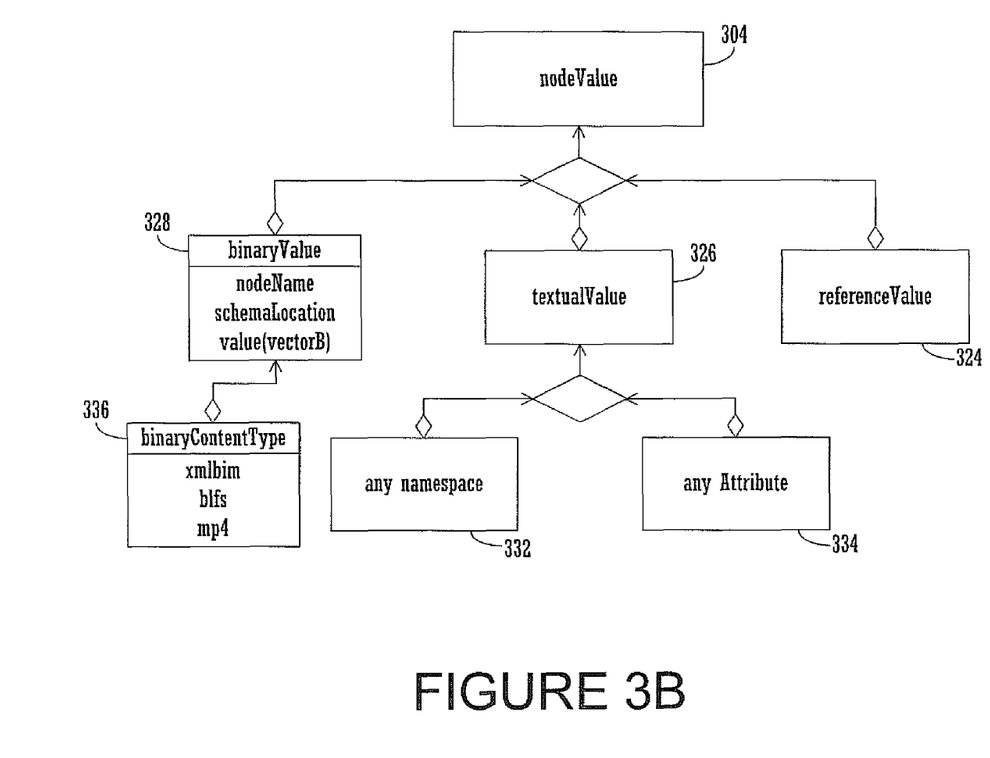

In order to more fully appreciate embodiments of the present invention, a Unified Modeling Language (UML) description of an embodiment of the present invention is shown in FIG. 3A and FIG. 3B. The UML description of the invention may be useful to understand the relationship between the various data structures of the CommandDS. It will be understood that the notation in FIG. 3A and FIG. 3B is to be read according to UML constructs. For example, the arrows with a diamond at one end in FIG. 3A show that commandType 302, node value 304, insertPosition 306, and authority level 308 are aggregates of the CommandDS 310. CommandDS 310 is within the Command Script 312. To the side, Vector B 314 is a subclass if the superclass list of Bytes 316.

FIG. 3B illustrates elements within nodeValue 304. For example, the referenceValue 324, textualValue 326 and binaryvalue 328. The textual value 326 is, in turn, composed of any namespace 332 and any attribute 334. The binaryvalue 328 is itself composed of node name, schema Location, and a value. The binaryValue 328 contains binaryContentType 314, which may be xmlbin, bifs, or mp4.

Figure 4:
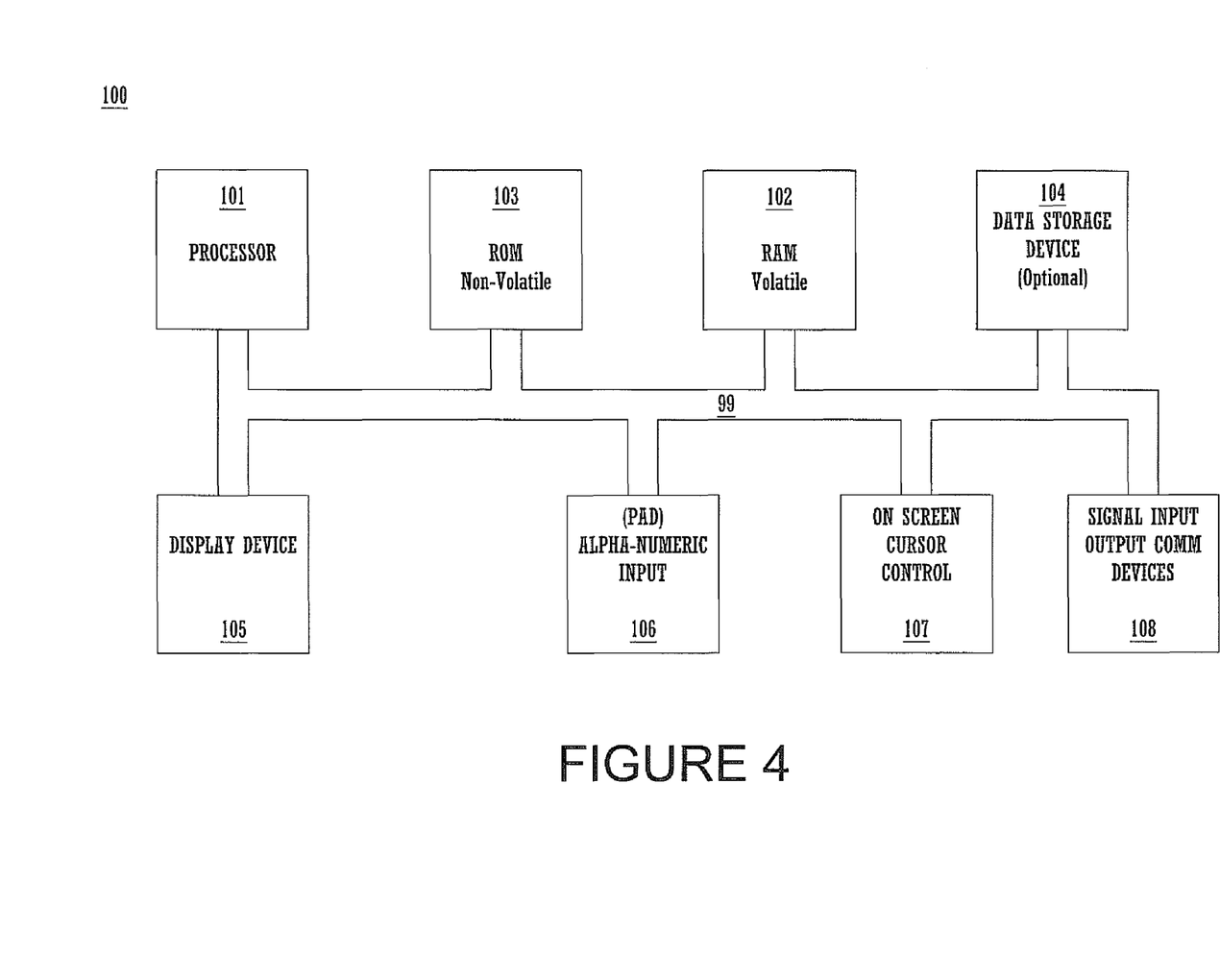
FIG. 4 is a schematic of a computer system, which may be used to implement embodiments of the present invention.

FIG. 4 illustrates circuitry of computer system 100, which may form a platform for embodiments of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., a magnetic or optical disk and disk drive) coupled with the bus 99 for storing information and instructions.

With reference still to FIG. 4, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A signal input/output communication device 108 coupled to bus 99 provides communication with external devices.

The preferred embodiment of the present invention a method and system for dynamically updating instance documents and their associated schemas is thus described. While the present invention has been described in particular embodiments, it should be appreciated that the present invention should not be construed as limited by such embodiments, but rather construed according to the below claims.

We claim:

1. In a server, a method for dynamically updating descriptions of audio-visual content information at a client, said method comprising:

said server sending to said client a command indicating a type of update to make at a particular node of a data structure residing at said client and describing an item of content, wherein said particular node contains information describing an attribute of said item of audio-visual content and wherein said particular node is one of a plurality of nodes of said structure, wherein said plurality of nodes are associated with one another to form said structure;

said server sending to said client the location of said particular node in said description; and said server retrieving and sending to said client any data related to said update, wherein said client executes said command and performs said update using Data Description Language (DDL).

2. The method of claim 1 further comprising:
determining whether said update is authorized to be performed.

3. The method of claim 1 wherein said sending said command indicating said type of update comprises:
issuing a command to add a node to said structure, wherein said client accomplishes said add by deriving an extension.

4. The method of claim 1 wherein said sending said command indicating said type of update comprises:
issuing a command to delete a node from said structure, wherein said client accomplishes said delete by deriving by restriction.

5. The method of claim 1 wherein said sending said command indicating said type of update comprises:
issuing a command to change said information contained by said particular node, wherein said client accomplishes said change by a combination of deriving an extension and deriving by restriction.

6. The method of claim 1 wherein said client alters said structure.

7. The method of claim 1 wherein said client alters a parameter at a node of said plurality of nodes.

8. The method of claim 1 wherein said sending said command indicating said type of update comprises:
issuing a derive by restriction command.

9. The method of claim 1 wherein said sending said command indicating said type of update comprises:
issuing a derive by extension command.

10. In a system comprising a first computer system and a second computer system coupled to said first computer system via a communication link, said second computer system having stored thereon a description of an item of audio-visual content, a method for dynamically updating said description, said method comprising:

said first computer system sending a command to said second computer system to perform a specified update at a particular node of a data structure of said description, wherein said structure resides on said second computer system and wherein nodes of said structure comprise information describing respective attributes of said item of audio-visual content;

said first computer system sending to said second computer system a location of said particular node in said description for said update;

said first computer system retrieving and sending any data related to said update to said second computer system, wherein said second computer system executes said command and performs said update using Data Description Language (DDL).

11. The method of claim 10 further comprising:
said first computer determining whether said update is authorized to be performed.

12. The method of claim 10 further comprising:
said second computer system determining whether said first computer system is authorized to instruct said update.

13. The method of claim 10 wherein said sending said command comprises:
issuing a command to add a node to said structure.

14. The method of claim 10 wherein said sending said command comprises:
issuing a command to delete a node from said structure.

15. The method of claim 10 wherein said sending said command comprises:
issuing a command to change information contained by said particular node.

16. The method of claim 10 wherein said second computer system alters a schema of said description, wherein said description comprises a tree structure and said update modifies said tree structure.

17. The method of claim 10 wherein said second computer system alters instance information, wherein said description comprises a tree structure and said update modifies a parameter at a node of said tree structure.

18. The method of claim 10 further comprising:
selecting from among a set of data stored on said first computer system to update said description on said second computer system.

19. The method of claim 10 wherein said first and said second computer systems form a peer-to-peer system.

20. The method of claim 10 further comprising:
receiving a request from said second computer system for information, wherein a pull operation is initiated.

21. The method of claim 10 further comprising:
determining that said description stored on said second computer system should be updated, wherein a push operation is initiated.

22. A computer readable medium residing on a first computer system having instructions stored thereon for causing a processor of said first computer system to instruct a processor of a second computer system to dynamically update an audio-visual content description residing on said second computer system, said instructions comprising:

said first computer system sending to said second computer system a command specifying an update at a particular node of a data structure of said description, wherein said structure resides on said second computer system and is associated with an item of content, wherein said particular node comprises information describing an attribute of said item of audio-visual content and wherein said particular node is one of a plurality of nodes of said structure, and wherein said plurality of nodes are associated with one another to form said structure;

said first computer system retrieving and sending any data that is related to said update to said second computer system; and said first computer system specifying to said second computer system a location of said particular node in said description, wherein said second computer system executes said command and performs said update using Data Description Language (DDL) using said data and said location sent by said first computer system.

23. The computer-readable medium of claim 22 wherein said command is selected from the group consisting of add, delete, and change commands.

24. The computer-readable medium of claim 22 wherein said location comprises an address selected from the group consisting of a relative address in said description and an absolute address in said description.

25. The computer-readable medium of claim 22 wherein said instructions further comprise specifying a security level to determine whether said update is allowed.

26. The computer-readable medium of claim 22 wherein said instructions are compliant with the Extensible Markup Language (XML).

* * * * *